N. S. COVEY.
FURNITURE CASTER.
APPLICATION FILED APR. 6, 1910.
983,210.
Patented Jan. 31, 1911.
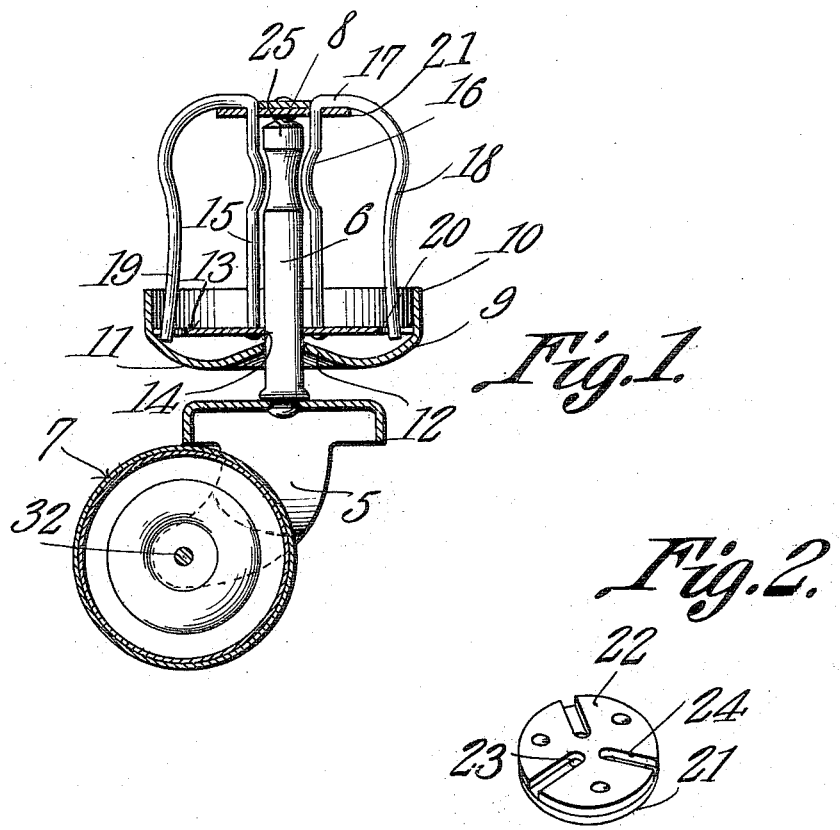

UNITED STATES PATENT OFFICE.

NATHAN SIMEON COVEY, OF CORRY, PENNSYLVANIA.

FURNITURE-CASTER.

983,210.  Specification of Letters Patent.  Patented Jan. 31, 1911.

Application filed April 6, 1910. Serial No. 553,716.

*To all whom it may concern:*

Be it known that I, NATHAN S. COVEY, a citizen of the United States, residing at Corry, in the county of Erie and State of Pennsylvania, have invented a new and useful Furniture-Caster, of which the following is a specification.

It is the object of the present invention to provide an improved construction of furniture caster and the improvements are directed more especially to a caster of the general construction shown in United States Patent Number 938,867, dated November 2, 1909. The caster shown in the said patent includes, in the construction of its socket member, a base, a head, and anchoring members in the form of wires each secured at one end to the base, engaged through the head, and seated at their other extremities in openings formed in a part of the base. In assembling the wires and the head, the wires are merely engaged through openings in the head and no means is provided for positively relatively spacing those portions of the wires which pass through and are adjacent the said head.

The present invention, therefore, aims to provide such means and thereby render the caster more substantial. Also, the invention aims to so construct the upper end of the shank of the caster proper that friction between this shank and the head above mentioned, against which head it has a bearing, will be practically obviated. Also, the invention aims to provide a novel means for retaining the shank of the caster proper in its bearing, which the invention aims to so construct that it will not interfere with the free rotation of the shank in the bearing.

It is a still further object of the invention to so construct the cap member of the base of the bearing for the caster that it may be made of sheet metal and will be as substantial as if cast or otherwise formed.

In the accompanying drawings,—Figure 1 is a vertical sectional view through a furniture caster embodying the present invention. Fig. 2 is a perspective view of one element of the bearing member of the caster.

In the drawings, the caster proper is illustrated as embodying a caster yoke, which is indicated by the numeral 5, a shank which is indicated by the numeral 6, and a caster wheel which is indicated in general by the numeral 7 and will presently be more specifically described, the yoke and shank of the caster being of the ordinary form except that the shank is circumferentially reduced adjacent its upper end, as at 8, for a purpose which will also be presently explained. The socket member of the caster embodies a base consisting of a cap member 9 which is stamped or otherwise formed from sheet metal and has an annular upstanding peripheral flange 10 and is cupped, as at 11, except at its center, where the material is struck up to afford a concavity 12 at the center of the member, in its under side. The striking up of the material at 12 serves to add great strength to the member, especially as this struck up portion is directly opposed, in contour, to the cupped part 11. A plate 13 is forced into place within the cap member until it assumes about the position illustrated in Fig. 1 of the drawings, and through this plate and the center or struck up part of the cap member there are formed openings, which are indicated by the numeral 14, and are in alinement. The plate 13 is also formed with openings extending in a series around the opening 14 therein and through each of these openings is engaged an anchoring member which is in the form of a length of resilient wire, indicated by the numeral 15, headed at its end which is inserted through the opening 14, and projecting upwardly from the said plate 13 in parallelism to the shank 6 of the caster except at the point 16 where the wire is crimped to project to a slight degree toward a shank 6. From their upwardly extending portion 14, the anchoring wires are bent to extend substantially at right angles radially, as at 17, and finally are bowed outwardly, as at 18, and thence, extended downwardly, as at 19, along their extremities constituting slots 20 formed in the plate 13, one radially beyond each of the first described openings through which the anchoring members are engaged.

The anchoring members just described are resilient, as will be readily understood, while their rear upstanding portions 14 are substantially relatively fixed, their portions beyond these portions are yieldable to a slight degree and when the bearing member is inserted in its socket in the article of furniture, the last mentioned portions of the anchoring members will be sprung inwardly due to depression of the members by the wall of the socket, the bearing member being retained in the socket due to this frictional engagement and binding of the said anchoring members by the wall of the socket.

The bearing member proper of the caster is in the form of a head comprising a pair of disks which are riveted or otherwise secured together in superposed relation, and of these disks the lower one is indicated by the numeral 21 and the upper one by the numeral 22, both of the disks being of the same diameter and being so secured together that their edges will register. The disk 21 is formed with an opening 23 corresponding in number to the number of anchoring members employed, these openings being located similarly to the openings through which the headed ends of the anchoring members are secured. The wires comprising the anchoring members are passed through the openings in the said disk 21, as is illustrated in Fig. 1 of the drawings, and in order that the said members may be relatively braced, the upper disk 22 is formed with radial notches 24 through which the portions 17 of the anchoring members engage or seat, it being understood that the notches at their inner ends register with the openings 23. It will be observed from an inspection of Fig. 1 of the drawings that the upper end or extremity of the caster shank 6 is conical whereby a single bearing point will be afforded, indicated by the numeral 25, and when the shank is inserted in the bearing member, this bearing point will contact with the under side of the disk 21. A pintle 32 is passed through the caster roller 7, axially, and through the spaced members of the yoke 5 as clearly illustrated in Fig. 1 of the drawings.

It will, of course, be understood from the foregoing description of the invention that instead of forming the head, shown in Fig. 2 with two disks which are secured together, the same may be in the nature of a single disk equal in thickness to about the combined thicknesses of the two disks shown in the said figure and formed with openings and depressions or notches corresponding to the openings of one disk and the notches of the other disk in the said figure. Also, it may be found equally as well to omit the means for securing the two disks together and either weld them or closely unite them in some other manner. It will further be understood from an inspection of the drawings and from the foregoing description that the crimping of the anchoring members at 16 serves to shorten their portions 15 to such degree as to cause the lower ends of the portions 19 to lower and engage with the slots 20. Thus, the crimping of the said portions 15 serves a double purpose and as such is considered as being a valuable feature of the invention.

What is claimed is:

1. In a caster, a socket member comprising a base, a plurality of anchoring members carried by the base, and a head supported by the members, the said members passing through the head and the said head having notches receiving portions of the members whereby to hold the same against relative displacement.

2. In a caster, a socket member comprising a base, a plurality of anchoring members carried by the base, and a head supported by the members, the said members passing through the head and the said head comprising superposed disks, one formed with openings through which the anchoring members pass, and the other formed with notches in which portions of the anchoring members seat.

3. In a caster, a socket member comprising a base, anchoring members secured each at one end to the base and projecting upwardly therefrom and thence bent back upon themselves with their ends seating in slots in the base, a bearing head supported by the upstanding portions of the anchoring members, the said portions of the anchoring members adjacent their upper ends being crimped inwardly, and a caster proper comprising a yoke and a shank fitted through the base and between the said upstanding members, the said shank being circumferentially reduced and receiving at its reduced portion the crimped portions of the anchoring members, the crimping of the said upstanding portions of the anchoring members serving to shorten the said portions and lower the last mentioned ends of the members into engagement with the slots.

4. In a caster, a socket member comprising a base, a plurality of resilient anchoring members carried by the base, the said base being provided with a shank receiving opening, the said anchoring members being disposed radial to said opening, and a bearing head supported by the said members, the said base comprising a blank stamped up to afford a cupped body having its concave side presented upwardly and having its central portion struck up to afford a concave presented downwardly.

In testimony that I claim the foregoing as my own, I have hereto affixed my signature in the presence of two witnesses.

NATHAN SIMEON COVEY.

Witnesses:
A. W. COVELL,
A. H. GATES.